Figure 1:
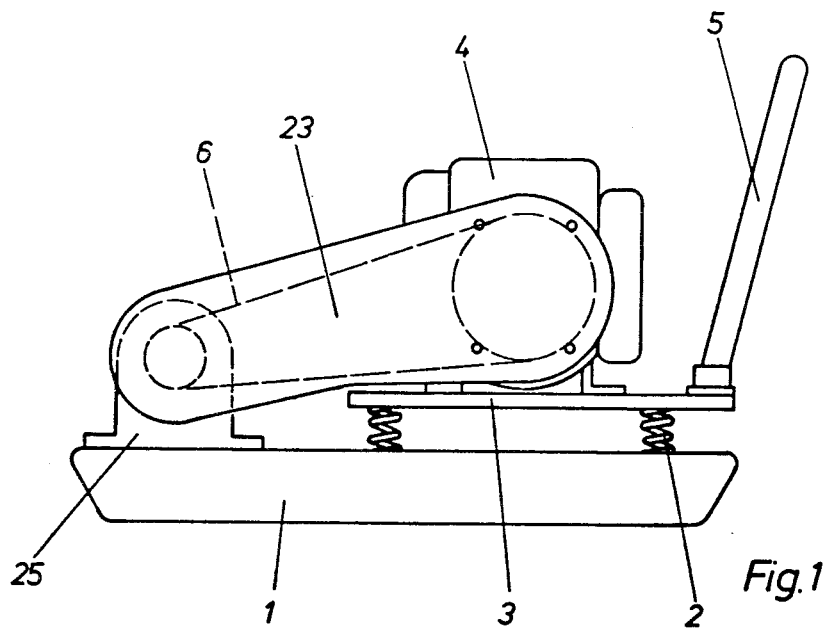
Figure 1:
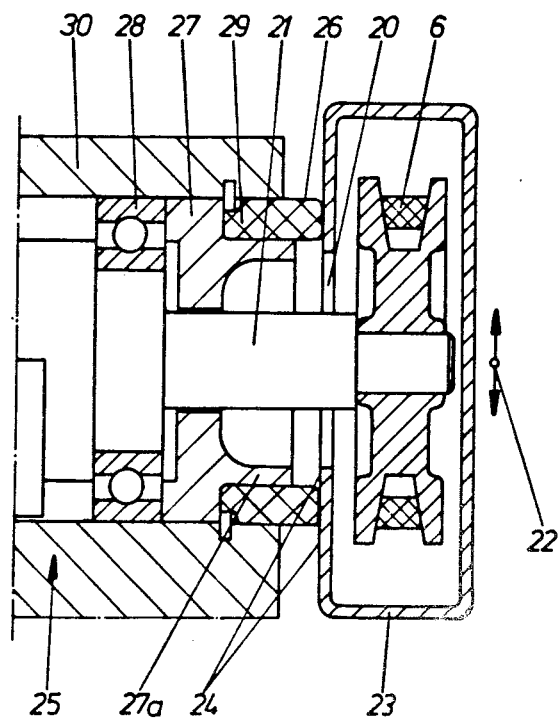

United States Patent [19]

Riedl

[11] 4,199,271
[45] Apr. 22, 1980

[54] DEVICE FOR SEALING V-BELT AND PULLEY IN PLATE JARRING DEVICES

[75] Inventor: Franz Riedl, München, Fed. Rep. of Germany

[73] Assignee: Wacker Werke GmbH & Co KG, Munich, Fed. Rep. of Germany

[21] Appl. No.: 891,690

[22] Filed: Mar. 30, 1978

[30] Foreign Application Priority Data

Mar. 31, 1977 [DE] Fed. Rep. of Germany ... 7710169[U]

[51] Int. Cl.$^2$ ............................................. E01C 19/38
[52] U.S. Cl. ....................................... 404/113; 74/611
[58] Field of Search ......................... 404/119, 113, 133; 308/3.5; 74/611, 87; 5/109

[56] References Cited

U.S. PATENT DOCUMENTS

| 1,788,992 | 1/1931 | Ecabert | 74/611 |
| 2,386,843 | 10/1945 | Davis | 404/113 |
| 2,825,242 | 3/1958 | Lowry | 74/611 |
| 3,199,424 | 8/1965 | Glass | 404/113 |
| 3,279,338 | 10/1966 | Briggs | 404/113 |
| 3,283,677 | 11/1966 | Uebel | 404/113 |
| 3,292,512 | 12/1966 | Schaperclaus | 404/113 |
| 3,939,730 | 2/1976 | DeHaan | 74/611 |

FOREIGN PATENT DOCUMENTS 607000 8/1948 United Kingdom ...................... 74/611

Primary Examiner—Nile C. Byers, Jr.
Attorney, Agent, or Firm—Becker & Becker, Inc.

[57] ABSTRACT

A device for sealing V-belts and pulleys in plate jarring devices, in which a V-belt drive interconnects the drive motor and the unbalance oscillation generator fixedly connected to the bottom plate. The drive motor is in the advancing direction of the device offset relative to the oscillation generator and is arranged on the applied load cushioned relative to the ground plate. The device furthermore includes a protective housing which surrounds the pulleys and the V-belt and is closed on all sides with the exception of the passages for passing the motor shaft and unbalance shaft therethrough. The protective housing is firmly connected to the motor or to the applied load including the motor. The motor shaft passes in a dustproof manner through the passage provided therefor in the protective housing while a seal arranged stationarily is interposed between the motor shaft and the protective housing. The passage for the unbalance shaft has a radial oversize with regard to the unbalance shaft which oversize corresponds to at least the oscillation amplitude between the applied load and the bottom plate. The seal between the protective housing and the housing of the unbalance oscillation is established by means of a sealing ring which surrounds the unbalance shaft outside the passage in the protective housing. The sealing ring is firmly connected to the protective housing or to the housing of the oscillation generator and by means of its free end face facing away from one of said housings engages a plane annular sealing surface on the housing of the oscillation generator or engages the protective housing in each phase of the relative oscillation movement between said unbalance shaft and said protective housing.

3 Claims, 2 Drawing Figures

DEVICE FOR SEALING V-BELT AND PULLEY IN PLATE JARRING DEVICES

The present invention relates to a device for sealing the V-belt and the pulleys in plate jarring devices in which the belt drive connects the unbalance oscillation generator rigidly connected to the bottom plate, to the driving motor. The driving motor is in advancing direction of the device offset relative to the oscillation generator and is arranged on the applied load which is cushioned relative to the bottom plate. The device is furthermore provided with a protective housing which surrounds the pulleys and the V-belt and with the exception of the passages for the motor shaft and the unbalance shaft is closed on all sides.

The sealing of the V-belt and of the pulleys is necessary in order to obtain as long a lifespan of the V-belt as possible since otherwise the V-belt will be quickly damaged in view of the dust, sand and stones whirled around during the operation of said device. The sealing of the passage for the drive shaft of the unbalance generator in the protective housing, however, represents a problem inasmuch as at this spot relative movements occur in view of the cushioning of the motor and of the jarring plate.

Heretofore known devices of the above mentioned general type have attempted to avoid the above mentioned problem of high relative movements at the mentioned spot, by rigidly connecting the protective housing to the unbalance oscillation generator so that at the passage for the unbalance shaft between the protective housing and the unbalance generator, no relative movements will occur. This idea is based on the fact that due to the oscillation geometric arrangement, the relative movements which will then occur between the motor shaft and the protective housing, are less. Such designs, however, have the two great disadvantages that a sealing of the remaining gap between the motor shaft and the protective housing is either not possible at all or if possible, would be considerably more expensive than it would be on the oscillation generator. Moreover, in view of the connection of the protective housing to the beating lower mass, the lifespan of the latter would be greatly reduced in view of occurring vibrations.

It is, therefore, an object of the present invention to provide a device of the above mentioned general type which will avoid the above-mentioned drawbacks and which will be relatively simple in construction.

These and other objects and advantages of the invention will appear more clearly from the following specification in connection with the accompanying drawing, in which:

FIG. 1 is a side view of the plate jarring or vibrating device according to the invention.

FIG. 2 on a larger scale than that of FIG. 1 represents a section through the structural elements which are adjacent the passage of the unbalance shaft into the protective housing, while the protective housing and the V-belt is shown in cross section, and the unbalance generator, as far as it can be seen is shown in longitudinal section with the V-belt pulley.

The device according to the invention is characterized primarily in that the protective housing is rigidly connected to the motor or to the applied load including the motor. Moreover, the motor shaft passes through the passage provided therefor in the protective housing, while a seal is interposed between the motor shaft and the protective housing. The passage for the unbalance shaft has a radial oversize with regard to the unbalance shaft which oversize corresponds to at least the oscillation amplitude between the applied load and the bottom plate. The seal between the protective housing and the housing of the unbalance oscillation generator is established by means of a sealing ring which surrounds the unbalance shaft outside the passage or opening in the protective housing. The sealing ring is rigidly connected to the protective housing or to the housing of the oscillation generator and by means of its free end face facing away from said protective housing engages a plane annular sealing surface on the housing of the oscillation generator or engages the protective housing in each phase of the relative oscillation movement between said unbalance shaft and said protective housing.

With the device according to the invention, it will thus be appreciated that as far as the seal is concerned, the heretofore particularly perpendicularly viewed automatic large amplitude of the relative movement between protective housing and unbalance shaft is deliberately tolerated in favor of a complete freedom of relative oscillatory movements between motor shaft and protective housing. In this way a considerable simplification of the seal at the last mentioned spot is obtained, and the problem of the large relative movements during the sealing between protective housing and unbalance shaft has been solved in a proper manner by a slidable seal between these parts, in the direction of the there occurring relative oscillatory movement.

According to a further development of the invention, it is provided that the housing of the oscillator generator has at its end face a groove which surrounds the unbalance shaft and is closed in itself, for receiving in a dust-proof manner the sealing ring and the annular sealing surface on the protective housing.

Referring now to the drawing in detail, the plate jarring device according to the invention which is shown diagrammatically only in FIG. 1, comprises in customary manner a ground compressing plate 1 with unbalance generator 25 rigidly connected on said ground plate 1 and with the load 3 cushioned relative to the ground plate 1, said load including the rigidly connected drive motor 4 and a guiding handle 5. The shaft of motor 4 and the unbalance shaft 21 of the unbalance oscillation generator 25 extend substantially perpendicular to the advancing direction of the plate jarring device.

For purposes of driving the unbalance shaft 21 by the motor 4, in this instance a V-belt drive is provided which comprises a pulley on the shaft of motor 4 and on the unbalance shaft 21 and furthermore comprises a V-belt 6 passing over said V-belt pulleys. The V-belt drive is protected by a protective housing 23. The protective housing 23 is rigidly connected to the motor 4 or the applied load 3 including the motor 4. The motor shaft passes through a passage opening provided for said motor shaft in the protective housing 23 but not specifically shown in the drawing, and is in a dust-proof manner sealed against the protective housing 23, by means of a stationary seal in a manner known per se between said passage and said protective housing 23.

In view of the rigid connection of the protective housing 23 on the motor 4 or on the applied load 3, the protective housing 23 carries out an oscillatory movement indicated in FIG. 2 by an arrow 22, in conformity with the oscillatory movement between ground compacting plate 1 and the applied load 3 while the plate jarring device is operating. This oscillatory movement is made possible by the design according to the invention shown in FIG. 2 while simultaneously the entry of dust or the like into the protective housing 23 is prevented.

According to FIG. 2, the passage 20 for the unbalance shaft 21 is provided with such a large radial oversize that said passage 20 will permit the oscillatory movement of the unbalance shaft 21 relative to the protective housing which is connected to the applied load and thus is considerably less movable in the space without the wall of the passage and the unbalance shaft contacting each other. The oscillatory movement of the unbalance shaft 21 relative to the protective housing is substantially effected in the direction of the arrow 22. The passage 20 is surrounded by a plane sealing surface 24 on the protective housing 23, which sealing surface 24 is substantially perpendicular to the unbalance shaft 21. This sealing surface 24 is permanently engaged by a sealing ring 26 which is fixedly connected to a generator housing 30 for the unbalance oscillation generator 25. The said sealing ring may consist for instance of elastic material or may by spring pressure or the like be held in engagement with the sealing surface 24. The sealing ring 26, also at the greatest relative oscillation amplitudes between the protective housing and the unbalance shaft, will with its end face facing said protective housing always remain in contact around said shaft. The passage 20 will also with the greatest amplitudes to be exptected not project radially to the unbalance shaft 21 beyond the sealing surface of ring 26 at the end face.

With the illustrated embodiment, by means of an insert 27 simultaneously fixing the bearing 28 for the unbalance shaft 21 in the generator housing 30, a groove is formed in cooperation with the housing 30. The sealing ring 26 is inserted in groove 29 and engages axially against the protective housing. The insert 21 has an extension 27a which extends up to near an extension 27a which supports the sealing ring from the inside and protects the sealing ring against undesired deformation as a result of relative oscillations between the protective housing and the unbalance oscillation generator.

A sectional illustration of the parts within the region where the motor shaft passes into the protective housing 23 does not appear to be necessary, because due to the rigid connection of said motor shaft on the applied load or the motor housing, between the protective housing and the motor shaft no relative oscillatory movements radial with regard to the motor shaft occur so that seals of commercially available types well known in the art could be employed for sealing the motor shaft and protective housing relative to each other.

It is, of course, to be understood that the present invention is, by no means, limited to the specific showing in the drawings, but also comprises any modifications within the scope of the appended claims.

What I claim is:

1. In combination in a jarring device having a bottom plate adapted to be jarred and having a forward moving advancing direction, an unbalance oscillation generator with a generator housing therefor having a shaft and being firmly connected to said bottom plate, an applied load, a drive motor having a motor shaft and mounted on said applied load, a belt drive drivingly connecting said drive motor to said unbalance oscillation generator, said drive motor in the bottom plate forward moving advancing direction of said jarring device being offset relative to said oscillation generator and being arranged on the applied load, means for cushioning said applied load relative to said bottom plate, a protective housing surrounding said belt drive and being closed on all sides with the exception of passage means for the shafts of said drive motor and said oscillation generator respectively, said protective housing being firmly connected to at least said motor, said motor shaft extending in a dustproof manner through said passage means provided therefore in said protective housing, sealing means stationarily interposed between said motor shaft and protective housing, said passage means for said shaft of said unbalance generator having a radial oversize with regard to said last mentioned shaft which oversize corresponds to at least the oscillation amplitude between said applied load and said bottom plate, sealing ring means surrounding said shaft of said unbalance oscillation generator outside the pertaining passage means in said protective housing for effecting a seal between said protective housing and said generator housing for said unbalance oscillation generator, said sealing ring means being firmly connected to one of said housings, said sealing ring means having one end face facing away from said one of said housings and in each phase of the relative oscillatory movement of said unbalance oscillation generator engaging a plane annular sealing surface substantially vertical with regard to said shaft of said unbalance oscillation generator between said last mentioned shaft and one of said housings.

2. The combination of claim 1, in which said drive motor forms a part of said applied load.

3. The combination according to claim 1, in which said generator housing for said unbalance oscillation generator has an end face provided with a groove surrounding the shaft of said unbalance oscillation generator for receiving said sealing ring means in a dustproof manner, said sealing ring means being arranged to engage axially against said protective housing.

* * * * *